United States Patent
Ozawa et al.

(10) Patent No.: US 9,005,750 B2
(45) Date of Patent: Apr. 14, 2015

(54) TRANSPARENT CONDUCTIVE FILM, ELECTRONIC DEVICE, AND TOUCH PANEL

(75) Inventors: Hiroki Ozawa, Ibaraki (JP); Naoki Hashimoto, Ibaraki (JP); Atsushi Kishi, Ibaraki (JP); Teppei Niinou, Ibaraki (JP); Hiroki Kuramoto, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 585 days.

(21) Appl. No.: 13/382,251

(22) PCT Filed: Jul. 7, 2010

(86) PCT No.: PCT/JP2010/061546
§ 371 (c)(1),
(2), (4) Date: Jan. 4, 2012

(87) PCT Pub. No.: WO2011/004845
PCT Pub. Date: Jan. 13, 2011

(65) Prior Publication Data
US 2012/0107605 A1    May 3, 2012

(30) Foreign Application Priority Data

Jul. 8, 2009   (JP) ................... 2009-162072
Mar. 30, 2010  (JP) ................... 2010-077192

(51) Int. Cl.
*G11B 5/708*    (2006.01)
*G11B 5/735*    (2006.01)
(Continued)

(52) U.S. Cl.
CPC *G06F 3/045* (2013.01); *C08J 7/045* (2013.01)

(58) Field of Classification Search
CPC ................... C08J 7/045; G06F 3/045
USPC ................... 428/323, 329, 328, 335
See application file for complete search history.

(56) References Cited

U.S. PATENT DOCUMENTS

2005/0147768 A1   7/2005   Hashimoto
2005/0208230 A1   9/2005   Ikeda
(Continued)

FOREIGN PATENT DOCUMENTS

CN   101111784 A   1/2008
CN   101155683 A   4/2008
(Continued)

OTHER PUBLICATIONS

Chinese Office Action dated Mar. 19, 2014, issued in corresponding Chinese Patent Application No. 201080030551.2 with partial English translation (19 pages).
(Continued)

*Primary Examiner* — Samir Shah
(74) *Attorney, Agent, or Firm* — Westerman, Hattori, Daniels & Adrian, LLP (57) ABSTRACT

Provided is a transparent conductive film including a hard coat layer having sufficient hardness, a superior abrasion resistance, and a superior soil resistance; also, provided are an electronic device and a touch panel using the transparent conductive film. A transparent conductive film 10 includes a transparent film base 11, a transparent conductive layer 12, and a hard coat layer 13, wherein the hard coat layer 13 is formed of a composition for forming hard coat containing the component (A): a curable compound including at least one of an acrylate group and a methacrylate group; the component (B): a reactive fluorine-containing compound; and the component (C): a reactive silicon-containing compound.

18 Claims, 3 Drawing Sheets

(51) Int. Cl.
*G11B 5/738* (2006.01)
*G06F 3/045* (2006.01)
*C08J 7/04* (2006.01)

(56) References Cited

U.S. PATENT DOCUMENTS

| | | | |
|---|---|---|---|
| 2006/0063113 | A1 | 3/2006 | Muramatsu |
| 2007/0048531 | A1 | 3/2007 | Nagaoka et al. |
| 2007/0146887 | A1 | 6/2007 | Ikeda et al. |
| 2007/0178297 | A1 | 8/2007 | Takada et al. |
| 2007/0298248 | A1 | 12/2007 | Hongo et al. |
| 2008/0160257 | A1 | 7/2008 | Takada et al. |
| 2008/0204634 | A1 | 8/2008 | Horio |
| 2009/0002323 | A1* | 1/2009 | Shiroishi et al. .............. 345/173 |
| 2009/0029151 | A1 | 1/2009 | Noguchi et al. |
| 2009/0168173 | A1 | 7/2009 | Asakura et al. |
| 2009/0244710 | A1* | 10/2009 | Tsuno et al. ................... 359/601 |
| 2009/0274902 | A1* | 11/2009 | Kume ........................... 428/336 |
| 2010/0028682 | A1 | 2/2010 | Shinohara |
| 2011/0135905 | A1 | 6/2011 | Wakita et al. |

FOREIGN PATENT DOCUMENTS

| | | |
|---|---|---|
| CN | 101310345 A | 11/2008 |
| JP | 11-149826 A | 6/1999 |
| JP | 2000-009908 A | 1/2000 |
| JP | 2003-335984 A | 3/2003 |
| JP | 2005-103979 A | 4/2005 |
| JP | 2005-111756 A | 4/2005 |
| JP | 2005-186568 A | 7/2005 |
| JP | 2005-301241 A | 10/2005 |
| JP | 2006-106427 A | 4/2006 |
| JP | 2006-182880 A | 7/2006 |
| JP | 2006-188557 A | 7/2006 |
| JP | 2006-208991 A | 8/2006 |
| JP | 2006-240292 A | 9/2006 |
| JP | 2006-337664 A | 12/2006 |
| JP | 2007-69471 A | 3/2007 |
| JP | 2007-229999 A | 9/2007 |
| JP | 2007-234424 A | 9/2007 |
| JP | 2007-264281 A | 10/2007 |
| JP | 2007-268753 A | 10/2007 |
| JP | 2008-088309 A | 4/2008 |
| JP | 2008-102514 A | 5/2008 |
| JP | 2008-151998 A | 7/2008 |
| KR | 10-2005-0092425 A | 9/2005 |
| KR | 10-2007-0087003 A | 8/2007 |
| TW | 200630448 A | 9/2006 |
| TW | 200631785 A | 9/2006 |
| TW | 200730576 A | 8/2007 |
| TW | 200838700 A | 10/2008 |
| WO | 2006/106756 A1 | 10/2006 |
| WO | 2007/102370 A1 | 9/2007 |
| WO | 2008/038714 A1 | 4/2008 |

OTHER PUBLICATIONS

Japanese Office Action dated Feb. 13, 2013, issued in corresponding Japanese Patent Application No. 2009252150 with Partial Translation (3 pages).
Japanese Office Action dated Apr. 8, 2011, issued in corresponding Japanese Patent Application No. 2008304359 with Partial Translation (3 pages).
Decision of Refusal dated May 22, 2012, issued in corresponding Japanese Patent Application No. 2008304359 with Partial Translation (3 pages).
Taiwanese Office Action dated Nov. 16, 2012, issued in corresponding Taiwanese Patent Application No. 098138798 with Partial Translation (6 pages).
Taiwanese Office Action dated Oct. 2, 2012, issued in corresponding Taiwanese Patent Application No. 098138802 with Partial Translation (5 pages).
Korean Office Action dated May 15, 2013, issued in corresponding Korean Patent Application No. 10-2012-7003281 with Partial Translation (6 pages).
Information Offer Form dated Jun. 25, 2012, issued in corresponding Japanese Patent Application No. 2010-154869, (39 pages). With English Translation.
Taiwanese Office Action dated Sep. 9, 2013, issued in Taiwanese Patent Application No. 099122324, w/English partial translation (15 pages).
International Search Report of PCT/JP2010/061546, mailing date Oct. 26, 2010.
Japanese Office Action dated Dec. 20, 2013, issued in related Japanese Patent Application No. 2013-084429 with partial English translation (6 pages).
Chinese Office Action dated Dec. 11, 2012, issued in corresponding Chinese Patent Application No. 201080030551.2, with Partial English translation 21 pages).
Japanese Office Action dated Aug. 13, 2013, issued in corresponding Japanese Application No. 2010-154869 with partial English Translation.
Chinese Office Action dated Aug. 7, 2013, issued in corresponding Chinese ApplicationNo. 201080030551.2 with partial English Translation.
Japanese Office Action dated Jun. 2, 2014, issued in corresponding Japanese Patent Application No. 2010-154869 with English translation (11 pages).

* cited by examiner

TRANSPARENT CONDUCTIVE FILM, ELECTRONIC DEVICE, AND TOUCH PANEL

TECHNICAL FIELD

The present invention relates to a transparent conductive film, an electronic device, and a touch panel.

BACKGROUND ART

Heretofore, as a transparent conductive layer, a so-called conductive glass in which an indium oxide thin film is formed on a glass has been well known. However, since the base of the conductive glass is glass, the flexibility and processability thereof are inferior and the conductive glass sometimes cannot be used depending on the purpose of use. Therefore, in recent years, transparent conductive films having various plastic films including a polyethylene terephthalate (PET) film have been used as bases in view of advantages such as a superior impact resistance and a superior lightweight property in addition to a superior flexibility and a superior processability.

In the case where a transparent conductive film is used for a touch panel, since the frequency of directly contacting with a conductive film is higher than the case where a transparent conductive film is used for a liquid crystal display or the like, compatibility between an abrasion resistance and a soil resistance is required. Hence, a transparent conductive film on which a hard coat layer is provided has been proposed. Further, in order to improve the abrasion resistance and soil resistance of the hard coat layer, a hard coat layer using a curable composition containing a compound that includes one of a fluorine atom and a silicon atom has been proposed (see, for example, Patent Document 1). However, with the diversification of applications of touch panels associated with the wide proliferation of touch panels in recent years, the diversification of opportunities for the surface to be scratched or to be soiled can be imagined. Accordingly, the transparent conductive film is required to have a higher level of abrasion resistance and a higher level of soil resistance and to maintain these properties.

RELATED ART DOCUMENT

Patent Document

[Patent Document 1] JP 2003-335984 A

BRIEF SUMMARY OF THE INVENTION

Problem to be Solved by the Invention

The present invention is intended to provide a transparent conductive film including a hard coat layer having sufficient hardness, a superior abrasion resistance, and a superior soil resistance; and the present invention is also intended to provide an electronic device and a touch panel using the transparent conductive film.

Means for Solving Problem

In order to achieve the aforementioned object, a transparent conductive film of the present invention comprises: a transparent film base; a transparent conductive layer; and a hard coat layer, wherein the hard coat layer is formed of a composition for forming hard coat containing the following component (A), component (B), and component (C).

Component (A): curable compound including at least one of acrylate group and methacrylate group Component (B): reactive fluorine-containing compound Component (C): reactive silicon-containing compound An electronic device of the present invention comprises: a transparent conductive film, wherein the transparent conductive film is the transparent conductive film of the present invention.

A touch panel of the present invention comprises: a transparent conductive film, wherein the transparent conductive film is the transparent conductive film of the present invention.

Effects of the Invention

Since the transparent conductive film of the present invention has sufficient hardness, a superior abrasion resistance, and a superior soil resistance, the surface thereof is less likely to be soiled for a long period of time. Further even in the case where the surface is soiled, the soil can be removed easily. Since the transparent conductive film of the present invention has a superior abrasion resistance, the surface thereof is less likely to be scratched due to removal of soil. Accordingly, the electronic device and touch panel using the transparent conductive film of the present invention can maintain favorable properties.

DESCRIPTION OF EMBODIMENTS

With respect to the transparent conductive film of the present invention, the component (B) may have the structure represented by the following general formula (1), for example. In the following general formula (1), at least one of Rs is a substituent including a fluoroalkyl group, and at least one of Rs is a substituent including at least one of an acrylate group and a methacrylate group.

(1)

With respect to the transparent conductive film of the present invention, in R in the general formula (1), the substituent including a fluoroalkyl group may have the structure represented by the following general formula (2), for example. The structure represented by the following general formula (2) includes, on its end, a perfluoro polyether unit ($-CF_2-CF_2-(O-CF_2-CF_2-CF_2)_n-O-CF_2-CF_3$). In the perfluoro polyether unit, n is an integer of 1 or more.

(2)

With respect to the transparent conductive film of the present invention, in R in the general formula (1), the substituent including an acrylate group may include a substituent represented by the following general formula (3), for example.

(3)

Preferably, the component (B) is represented by the general formula (1); and in R in the general formula (1), one substituent including a fluoroalkyl group having the structure represented by the general formula (2) and two substituents each including an acrylate group having the structure represented by the general formula (3) are included.

With respect to the transparent conductive film of the present invention, the component (C) may have the structure represented by the following general formula (4), for example. In the following general formula (4), R is a substituent selected from the group consisting of a substituent having a siloxane structure, a substituent including at least one of an acrylate group and a methacrylate group, and a substituent including an active hydrogen group; and each R may be the same or different.

(4)

With respect to the transparent conductive film of the present invention, the component (C) may have the structure represented by the following general formula (9), for example. The structure represented by the following general formula (9) is referred to as a (6-isocyanate-hexyl)isocyanuric acid unit (a).

(9)

With respect to the transparent conductive film of the present invention, in R in the general formula (4), the substituent having a siloxane structure may have the structure represented by the following general formula (5), for example. The structure represented by the following general formula (5) includes, on its end, a polydimethylsiloxane unit (c). The unit (c) is bound to a methyl hydroxypropyl siloxane unit (b), and the hydroxy group of the unit (b) is bound to the terminal isocyanate group of the (6-isocyanate-hexyl)isocyanuric acid, which is a part of the unit (a), through an urethane bond. In the polydimethylsiloxane unit (c), n is an integer of 1 or more and is preferably 1 to 7.

(5)

With respect to the transparent conductive film of the present invention, in R in the general formula (4), the substituent including an active hydrogen group may include a substituent represented by the following general formula (6), for example. In the substituent represented by the general formula (6), the terminal isocyanate group of the (6-isocyanate-hexyl)isocyanuric acid, which is a part of the unit (a), is a carboxyl group. Further, in the substituent represented by the general formula (6), the carboxyl group may be decarbonated to be an amino group.

(6)

With respect to the transparent conductive film of the present invention, in R in the general formula (4), the substituent including an acrylate group may have the structure represented by the following general formula (7), for example. The structure represented by the general formula (7) includes, on its end, an aliphatic polyester unit including an acrylate group (d). The unit (d) is bound to the terminal isocyanate group of the (6-isocyanate-hexyl)isocyanuric acid, which is a part of the unit (a), through an urethane bond. In the general formula (7), m and n each are an integer of 1 to 10 and may be the same or different, and l is an integer of 1 to 5.

With respect to the transparent conductive film of the present invention, preferably, the composition for forming hard coat further contains the following component (D).
Component (D): particle having inorganic oxide particle surface modified with organic compound containing polymerizable unsaturated group, and having weight-average particle size of 200 nm or less.

With respect to the transparent conductive film of the present invention, in view of prevention of scattering of light, prevention of decrease in transmittance of a hard coat layer, prevention of being colored, and transparency, the weight-average particle size of the component (D) is preferably in the (7)

In the case where the component (C) contains the unit (a) represented by the general formula (9) and is a derivative of a (6-isocyanate-hexyl)isocyanuric acid containing the substituents represented by the general formulae (5) to (7), the component ratio (molar ratio) among the unit (a), the unit (b), the unit (c), and the unit (d) is as follows. That is, with the assumption that the unit (a) is 100, the unit (b) is, for example, in the range from 1 to 80 and preferably in the range from 1 to 60, the unit (c) is, for example, in the range from 10 to 400 and preferably in the range from 10 to 300, and the unit (d) is, for example, in the range from 1 to 100 and preferably in the range from 5 to 50.

In the present invention, the ratio (molar ratio) among constituents (units) of the component (C) can be obtained, for example, by the integral curve of spectrum. The weight-average molecular weight (Mw) of the component (C) is, for example, in the range from 500 to 150000 and preferably in the range from 2000 to 100000. The weight-average molecular weight (Mw) can be measured, for example, by a gel permeation chromatography (GPC) method.

range from 1 to 100 nm. The weight-average particle size can be measured, for example, by the method described in Examples described below.

With respect to the transparent conductive film of the present invention, examples of the component (D) include fine particles such as titanium oxide, silicon oxide, aluminum oxide, zinc oxide, tin oxide, and zirconium oxide. Among them, fine particles such as titanium oxide, silicon oxide (silica), aluminum oxide, zinc oxide, tin oxide, and zirconium oxide are preferred. One of them may be used alone or two or more of them may be used in combination.

With respect to the transparent conductive film of the present invention, preferably, the composition for forming hard coat contains the component (D) in the range from 100 to 200 parts by weight relative to 100 parts by weight of the component (A).

With respect to the transparent conductive film of the present invention, preferably, the composition for forming hard coat further contains the following component (E).
Component (E): glycol-based compound represented by general formula (8)

(8)

Preferably, a compound having the structure represented by the general formula (1) is used as the component (B) and a compound having the structure represented by the general formula (4) is used as the component (C). When the compounds of similar structure are used, it can be presumed that the action of each compound is more likely to be expressed in the hard coat layer formed. However, the present invention is not limited at all by this presumption.

With respect to the transparent conductive film of the present invention, preferably, the composition for forming hard coat contains the component (B) in the range from 0.05 to 0.4 parts by weight and the component (C) in the range from 0.05 to 1 parts by weight relative to 100 parts by weight of the component (A).

In the general formula (8), m and n each are an integer of 1 or more and may be the same or different.

With respect to the transparent conductive film of the present invention, preferably, the composition for forming hard coat contains the component (B) in the range from 0.05 to 0.4 parts by weight and the component (C) and the component (E) in total in the range from 0.1 to 1 parts by weight relative to 100 parts by weight of the component (A).

With respect to the transparent conductive film of the present invention, preferably, the intensity of a fluorine atom derived from a reactive fluorine-containing compound of the outermost layer of the hard coat layer is within the range from 5 to 30% according to the analysis by an electron spectroscopy for chemical analysis (ESCA), and the intensity of a silicon atom derived from a reactive silicon-containing compound of the outermost layer of the hard coat layer is within the range from 0.2 to 10% according to the analysis by the ESCA. When the intensity of each of the atoms is in the aforementioned range, compatibility between the abrasion resistance and soil resistance can be achieved more favorably.

In the meantime, the amount of the reactive fluorine-containing compound or the reactive silicon-containing compound to be added tends not to necessarily agree with or not to bear a proportional relationship to the intensity of each of the atoms at the outermost layer. For example, even in the case where hard coat layers are formed using compositions for forming hard coat layer having the same composition, when the thickness of the hard coat layer differs, there is a case that the intensity of each of the atoms at the outermost layer differs. Accordingly, when a hard coat film having favorable properties using the composition for forming hard coat layer of the present invention is intended to be obtained, it is effective to make a property evaluation focused on the intensity of each of the atoms.

The intensity of the fluorine atom is preferably within the range from 10 to 30% and still more preferably within the range from 15 to 30%. The intensity of a silicon atom is more preferably within the range from 0.2 to 8% and still more preferably within the range from 0.2 to 6%.

With respect to the transparent conductive film of the present invention, the thickness of the hard coat layer is not particularly limited and an optimal thickness can be set depending on the thickness or the like of the transparent film base. For example, the thickness is in the range from 3 to 50 μm. By setting the thickness in the aforementioned range, occurrence of curling and folding of the transparent conductive film can be prevented more effectively without causing the decrease in hardness. The thickness is more preferably in the range from 4 to 25 μm and still more preferably in the range from 5 to 18 μm.

With respect to the transparent conductive film of the present invention, preferably, the pencil hardness of the surface of the hard coat layer at a load of 500 g according to JIS K 5600-5-4 is 4H or more.

With respect to the transparent conductive film of the present invention, preferably, the surface free energy of the surface of the hard coat layer is in the range from 15 to 25 mJ/m². The surface free energy is a value obtained by the calculation of two components, water/hexadecane, based on the Kaelble-Uy theory. The surface free energy is more preferably in the range from 15 to 22 mJ/m² and still more preferably in the range from 15 to 20 mJ/m². The surface free energy value is calculated from a value obtained by measuring the contact angle of each of water and hexadecane. The surface free energy value can be calculated automatically by the use of the "fully-automated contact angle meter DM700" produced by Kyowa Interface Science Co., Ltd., or the like.

With respect to the transparent conductive film of the present invention, preferably, the hard coat layer further contains fine particles.

With respect to the transparent conductive film of the present invention, preferably, the transparent film base includes the hard coat layer on one side and the transparent conductive layer on the other side.

With respect to the transparent conductive film of the present invention, preferably, the transparent film base is a laminate obtained by bonding plural transparent films via transparent adhesive agent layers.

With respect to the transparent conductive film of the present invention, preferably, at least one of the transparent films is a decorative film.

Next, the present invention will be described in detail. However, the present invention is not limited to the following descriptions.

The transparent conductive film of the present invention includes a transparent film base, a transparent conductive layer, and a hard coat layer. The transparent conductive film of the present invention may include the hard coat layer on one side of the transparent film base and include the transparent conductive layer on the other side of the transparent film base. Alternatively, the transparent conductive film of the present invention may include the transparent conductive layer on one side of the transparent film base and include the hard coat layer on the transparent conductive layer. In view of providing a superior soil resistance, with respect to the transparent conductive film of the present invention, the hard coat layer is preferably laminated on the outermost surface side (for example, on the side to be viewed when the transparent conductive film is used as a touch panel), which is to be contacted by fingers, pens, and the like.

The material of the transparent film base is not particularly limited and various transparent materials can selectively be used as appropriate. Those having superior light beam transmittance of visible light (preferably those having light beam transmittance of 90% or more) and superior transparency (preferably, those having a haze value of 1% or less) are preferred. Examples of the materials include a polyester-based resin, an acetate-based resin, a polyethersulfone-based resin, a polycarbonate-based resin, a polyamide-based resin, a polyimide-based resin, a polyolefin-based resin, an acrylic-based resin, a polyvinyl chloride-based resin, a polyvinylidene chloride-based resin, a polystyrene-based resin, a polyvinyl alcohol-based resin, a polyarylate-based resin, and a polyphenylene sulfide-based resin. Among them, a polyester-based resin, a polycarbonate-based resin, and a polyolefin-based resin are suitable.

The refractive index of the transparent film base is not particularly limited. The refractive index is, for example, in the range from 1.30 to 1.80 and preferably in the range from 1.40 to 1.70.

In the present invention, the thickness of the transparent film base is preferably in the range from 1 to 400 μm in consideration of strength, a thin layer property, and a workability such as a handleability. The thickness of the transparent film base is more preferably in the range from 5 to 200 μm. In the case where the thickness is less than 1 μm, it is not preferable in terms of durability and processability. On the other hand, in the case where the thickness is more than 400 μm, it is not preferable because the thickness of the structural member is increased in an electronic device and a touch panel provided with the transparent conductive film of the present invention. In addition, for example, it is not preferable because a heavy load is required for input in the case where the transparent conductive film is used for a resistive film type touch panel.

The transparent film base may be a laminate obtained by bonding plural transparent films via transparent adhesive agent layers. In this case, the thickness and the material of each film can be suitably selected. Preferably, at least one of the films has a thickness in the range from 20 to 125 μm.

The transparent film base may be a decorative film. In the case where the transparent film base is a laminate obtained by bonding plural transparent films via transparent adhesive agent layers, at least one of the transparent films may be a decorative film. As the decorative film, a transparent film applied with colors and patterns by a conventional method such as printing on one side or both sides can be used. When the transparent conductive layer is formed on the decorative film by a sputtering method, there is a case that a decorated part is damaged by heat that is applied at the time of sputtering. Therefore, in the case of using the decorative film, as described above, preferably, a laminate of plural transparent films is used as the transparent film base and the transparent conductive layer is formed on an undecorated transparent film.

In the case where the transparent film base is a laminate of the transparent films, as the adhesive agent layer used, one having transparency can be used without limitation. For example, an acrylic-based adhesive agent, a silicone-based adhesive agent, and a rubber-based adhesive agent can be used. The adhesive agent layer has a function of improving the abrasion resistance of the transparent conductive layer provided on one side of the transparent film base and improving the tap properties in the case where the transparent conductive film is used for a touch panel by its cushioning effect after the transparent films are bonded. In view of providing this function more effectively, the elastic modulus of the adhesive agent layer is preferably set in the range from 1 to 100 $N/cm^2$. From the same reason, the thickness of the adhesive agent layer is preferably 1 μm or more and more preferably in the range from 5 to 100 μm.

When the elastic modulus is less than 1 $N/cm^2$, the adhesive agent layer becomes inelastic and therefore is easily deformed by pressure to cause asperities on the film base and also on the transparent conductive layer. Further, the adhesive agent is apt to be squeezed out from the cutting surface. Moreover, effects of improving the abrasion resistance of the transparent conductive layer and the tap properties decrease. On the other hand, when the elastic modulus exceeds 100 $N/cm^2$, the adhesive agent layer becomes rigid and its cushioning effect cannot be expected. Therefore, the abrasion resistance of the transparent conductive layer and the tap properties cannot be improved. Further, when the thickness of the adhesive agent layer is less than 1 μm, since the cushioning effect cannot be expected, the improvement of the abrasion resistance of the transparent conductive layer and tap properties cannot be expected. In contrast, when the adhesive agent layer is too thick, there is a case that the transparency is damaged and favorable results in workability and cost cannot be obtained at the time of formation of the adhesive agent layer and bonding of the film base.

The transparent film base may be provided with a layer applied with easy adhesion treatment (hereinafter, referred to as an "easy adhesion layer") on its surface so as to improve the adhesion with the hard coat layer and the transparent conductive layer. The easy adhesion layer can be provided by preliminarily applying sputtering treatment, corona discharge treatment, plasma treatment, flame treatment, ultraviolet irradiation treatment, electron beam irradiation treatment, acid or alkali treatment, or etching treatment to the surface of the transparent film base. Also, the easy adhesion layer can be provided by applying undercoating treatment. In advance of forming the hard coat layer and the transparent conductive layer, dust removal and cleanup can be performed by solvent cleaning, ultrasonic cleaning, and the like if needed. To provide the easy adhesion layer is particularly effective at the time of forming the hard coat layer.

The material used for forming the transparent conductive layer is not particularly limited and materials capable of forming a transparent conductive film can selectively be used as appropriate. For example, gold, silver, platinum, palladium, copper, aluminum, nickel, chromium, titanium, iron, cobalt, tin, and metals made of the alloys thereof; indium oxide, tin oxide, titanium oxide, cadmium oxide, and metallic oxide made of the mixtures thereof; other metallic compounds made of copper iodide and the like; conductive polymers such as polythiophene and polyaniline; and compositions containing a carbon nanotube can be used. The transparent conductive layer can be either a crystalline layer or a non-crystalline layer. As the material, indium oxide that contains tin oxide and tin oxide that contains antimony are preferably used.

As the method of forming the transparent conductive layer, for example, various methods such as a vacuum evaporation method, a sputtering method, an ion plating method, a spray pyrolysis method, a chemical plating method, an electroplating method, and a combined method thereof can be selected suitably. In light of the formation speed of the transparent conductive layer, the formability of a large-area film, and productivity, the vacuum evaporation method and the sputtering method are favorably employed.

The thickness of the transparent conductive layer can be decided suitably according to the purpose of use. The thickness is normally in the range from 10 to 300 nm, preferably in the range from 10 to 200 nm, and more preferably in the range from 15 to 50 nm. Preferably, the transparent conductive layer is a continuous film of favorable conductivity having a surface resistance value of not more than $1 \times 10^3$ Ω/sq.

The transparent conductive layer may be provided via an anchor layer. One or more than one anchor layer may be provided. The anchor layer is formed from an inorganic substance, an organic substance, or a mixture of the inorganic substance and the organic substance. The formation of the anchor layer is effective for improving the adhesion between the transparent film base and the transparent conductive layer, for improving the abrasion resistance and flex resistance of the transparent conductive layer, and for improving the tap properties in the case where the transparent conductive layer is used as a touch panel.

As the inorganic materials for forming the anchor layer, for example, inorganic substances such as $SiO_2$, $MgF_2$, and $Al_2O_3$ are preferably used. Further, examples of the organic substance include an acrylic resin, an urethan resin, a melamine resin, an alkyd resin, and a siloxane-based polymer. Particularly, as the organic substance, it is desirable to use a thermosetting resin formed from a mixture of the melamine resin, the alkyd resin, and an organic silane condensate.

The anchor layer can be formed using the aforementioned materials by a vacuum evaporation method, a sputtering method, an ion plating method, a coating method, or the like.

The thickness of the anchor layer is normally 100 nm or less, preferably in the range from about 15 to 100 nm, and more preferably in the range from 20 to 60 nm.

The hard coat layer is formed using a composition for forming hard coat layer containing the component (A), the component (B), and the component (C).

As the component (A), for example, a curable compound that includes at least one of an acrylate group and a methacrylate group and that is cured by heat, light (ultraviolet or the like), an electron beam, or the like can be used. Examples of the component (A) include a silicone resin, a polyester resin, a polyether resin, an epoxy resin, an urethan resin, an alkyd resin, a spiroacetal resin, a polybutadiene resin, a polythiol polyene resin, and an oligomer or a prepolymer of acrylate and methacrylate of a polyfunctional compound such as polyalcohol. One of them may be used alone or two or more of them may be used in combination.

As the component (A), for example, a reactive diluent that includes at least one of an acrylate group and a methacrylate group can be used. Examples of the reactive diluent include monofunctional acrylate, monofunctional methacrylate, polyfunctional acrylate, and polyfunctional methacrylate. Examples of the monofunctional acrylate include acrylate of ethylene oxide denatured phenol, acrylate of propylene oxide denatured phenol, acrylate of ethylene oxide denatured nonylphenol, acrylate of propylene oxide denatured nonylphenol, 2-ethylhexyl carbitolacrylate, isobornyl acrylate, tetrahydrofurfuryl acrylate, hydroxyethyl acrylate, hydroxypropyl acrylate, hydroxybutyl acrylate, hydroxyhexylacrylate, diethylene glycol monoacrylate, triethylene glycol monoacrylate, and tripropylene glycol monoacrylate. Examples of the monofunctional methacrylate include methacrylate of ethylene oxide denatured phenol, methacrylate of propylene oxide denatured phenol, methacrylate of ethylene oxide denatured nonylphenol, methacrylate of propylene oxide denatured nonylphenol, 2-ethylhexyl carbitolmetha-ciylate, isobornyl methacrylate, tetrahydrofurfuryl methacrylate, hydroxyethyl methacrylate; hydroxypropyl methacrylate, hydroxybutylmethacrylate, hydroxyhexylmethacrylate, diethylene glycol monomethacrylate, triethylene glycol monomethacrylate, and tripropylene glycol monomethacrylate. Examples of the polyfunctional acrylate include diethylene glycol diacrylate, triethylene glycol diacrylate, dipropylene glycol diacrylate, tripropylene glycol diacrylate, tetrapropylene glycol diacrylate, polypropylene glycol diacrylate, 1,4-butanedioldiacrylate, neopentyl glycol diacrylate, 1,6-hexanediol diacrylate, diacrylate of ethylene oxide denatured neopentyl glycol, diacrylate of ethylene oxide denatured bisphenol A, diacrylate of propylene oxide denatured bisphenol A, diacrylate of ethylene oxide denatured hydrogenerated bisphenol A, trimethylolpropane diacrylate, trimethylolpropane allyl ether diacrylate, trimethylolpropane triacrylate, ethylene oxide denatured trimethylolpropane triacrylate, propylene oxide denatured trimethylolpropane triacrylate, pentaerythritol tetraacrylate, dipentaerythritol tetraacrylate, and dipentaerythritol hexaacrylate. Examples of the polyfunctional methacrylate include diethylene glycol dimethacrylate, triethylene glycol dimethacrylate, dipropylene glycol dimethacrylate, tripropylene glycol dimethacrylate, tetrapropylene glycol dimethacrylate, polypropylene glycol dimethacrylate, 1,4-butanedioldimethacrylate, neopentyl glycol dimethacrylate, 1,6-hexanediol dimethacrylate, dimethacrylate of ethylene oxide denatured neopentyl glycol, dimethacrylate of ethylene oxide denatured bisphenol A, dimethacrylate of propylene oxide denatured bisphenol A, dimethacrylate of ethylene oxide denatured hydrogenerated bisphenol A, trimethylolpropane dimethacrylate, trimethylolpropane allyl ether dimethacrylate, trimethylolpropane trimethacrylate, ethylene oxide denatured trimethylolpropane trimethacrylate, propylene oxide denatured trimethylolpropane trimethacrylate, pentaerythritol tetramethacrylate, dipentaerythritol tetramethacrylate, and dipentaerythritol hexamethacrylate. As the reactive diluent, acrylate of trifunction or more and methacrylate of trifunction or more are preferred. This is due to the reason that the hardness of the hard coat layer can be more improved. Also, examples of the component (A) include butanediol glycerin ether diacrylate, acrylate of isocyanuric acid, and methacrylate of isocyanuric acid. With respect to the component (A), one of the aforementioned substances may be used alone or two or more of them may be used in combination.

Details of the component (B) and the component (C) are as described above. By the use of the component (B), the surface free energy value of the hard coat layer obtained is decreased and the soil resistance of the hard coat layer is improved. On the other hand, when the component (B) is added excessively, the abrasion resistance of the hard coat layer obtained tends to be decreased. Further, by the use of the component (C), the surface structure of the hard coat layer obtained is strengthened, the slippability is improved, and a superior abrasion resistance is obtained, for example. On the other hand, when the component (C) is added excessively, the soil resistance of the hard coat layer obtained tends to be decreased. In view of these points, the blending ratios of the component (B) and the component (C) relative to the component (A) are as follows. That is, preferably, the blending ratio of the component (B) is in the range from 0.05 to 0.4 parts by weight relative to 100 parts by weight of the component (A) and the blending ratio of the component (C) is in the range from 0.05 to 1.0 parts by weight relative to 100 parts by weight of the component (A). More preferably, the blending ratio of the component (B) is in the range from 0.1 to 0.3 parts by weight relative to 100 parts by weight of the component (A) and the blending ratio of the component (C) is in the range from 0.2 to 1.0 parts by weight relative to 100 parts by weight of the component (A).

The transparent conductive film of the present invention can be produced as follows, for example. That is, a transparent conductive layer is formed on one side of the transparent film base. Further, a composition for forming hard coat layer in which the aforementioned three components are dissolved or dispersed in a solvent is prepared. Then, the composition for forming hard coat layer is applied to the transparent film base provided with the transparent conductive layer to form a coating film, and thereby formed the transparent conductive film of the present invention. The composition for forming hard coat layer may be applied to the transparent conductive layer or to the surface of the transparent film base on which the transparent conductive layer is not formed. Also, the composition for forming hard coat layer can be applied to the both surfaces of the transparent film base provided with the transparent conductive layer.

The solvent is not particularly limited. Examples of the solvent include dibutyl ether, dimethoxymethane, dimethoxyethane, diethoxyethane, propylene oxide, 1,4-dioxane, 1,3-dioxolan, 1,3,5-trioxane, tetrahydrofuran, acetone, methyl ethyl ketone (MEK), diethyl ketone, dipropyl ketone, diisobutyl ketone, cyclopentanone, cyclohexanone, methyl cyclohexanone, ethyl formate, propyl formate, n-pentyl formate, methyl acetate, ethyl acetate, methyl propionate, ethyl propionate, n-pentyl acetate, acetylacetone, diacetone alcohol, methyl acetoacetate, ethyl acetoacetate, methanol, ethanol, 1-propanol, 2-propanol, 1-butanol, 2-butanol, 1-pentanol, 2-methyl-2-butanol, cyclohexanol, isobutyl acetate, methyl isobutyl ketone (MIBK), 2-octanone, 2-pentanone, 2-hexanone, 2-heptanone, 3-heptanone, ethylene glycol monoethyl ether acetate, ethylene glycol monoethyl ether, ethylene glycol monobutyl ether, ethylene glycol monomethyl ether, propylene glycol monomethyl ether acetate, and propylene glycol monomethyl ether. One of them may be used alone or two or more of them may be used in combination.

As described above, preferably, the composition for forming hard coat layer further contains the component (D). In the component (D), examples of the inorganic oxide particle include fine particles such as silicon oxide (silica), titanium oxide, aluminum oxide, zinc oxide, tin oxide, and zirconium oxide. Among them, fine particles such as silicon oxide (silica), titanium oxide, aluminum oxide, zinc oxide, tin oxide, and zirconium oxide are preferred. One of them may be used alone or two or more of them may be used in combination.

With respect to composition for forming hard coat layer of the present invention, in view of prevention of scattering of light, prevention of decrease in transmittance of a hard coat layer, prevention of being colored, and transparency, the component (D) is a so-called nanoparticle having a weight-average particle size of 200 nm or less. The weight-average particle size can be measured, for example, by the method described in Examples described below. The weight-average particle size is preferably in the range from 1 nm to 100 nm.

In the component (D), the inorganic oxide particle is bound to an organic compound containing a polymerizable unsaturated group (surface modification). When the polymerizable unsaturated group and the component (A) react and cure, the hardness of the hard coat layer is improved. Examples of the polymerizable unsaturated group include an acryloyl group, a methacryloyl group, a vinyl group, a propenyl group, a butadienyl group, a styryl group, an ethynyl group, a cinnamoyl group, a maleate group, and an acrylamide group. Further, the organic compound containing a polymerizable unsaturated group is preferably a compound including a silanol group in its molecule or a compound generating a silanol group by hydrolysis. Also, the organic compound containing a polymerizable unsaturated group is preferably a compound including a photosensitive group.

The blending amount of the component (D) is preferably in the range from 100 to 200 parts by weight relative to 100 parts by weight of the component (A). By setting the blending amount of the component (D) at least 100 parts by weight, occurrence of curling and folding of the transparent conductive film can be prevented more effectively. By setting the blending amount of the component (D) not more than 200 parts by weight, a higher abrasion resistance and higher pencil hardness can be achieved. The blending amount of the component (D) is preferably in the range from 120 to 180 parts by weight relative to 100 parts by weight of the component (A).

By adjusting the blending amount of the component (D), for example, the refractive index of the hard coat layer can be adjusted. In terms of prevention of interference pattern generated at the interface between the transparent film base and the hard coat layer, preferably, the refractive index difference between the transparent film base and the hard coat layer is small. The interference pattern is a phenomenon that the reflected light of external light entered in the transparent conductive film shows a rainbow-colored hue. Recently, three band fluorescent lamps having superior clarity have been heavily used in offices and the like. The interference pattern appears prominently under the three band fluorescent lamp. In view of these points, at the time of preparing the composition for forming hard coat layer, preferably, the blending amount of the component (D) is adjusted so that the refractive index difference becomes small.

The refractive index difference is preferably 0.04 or less and more preferably 0.02 or less. Specifically, for example, in the case where a PET film (refractive index: about 1.64) is used as the transparent film base, by using titanium oxide as the component (D) and by blending the component (D) about 30 to 40 wt % relative to the whole resin components in the composition for forming hard coat layer, the refractive index difference can be controlled to 0.02 or less. Thereby, generation of interference pattern can be suppressed.

As described above, preferably, the composition for forming hard coat layer further contains the component (E).

In the case where the component (E) is used, at the time of preparing the composition for forming hard coat layer, preferably, the component (E) is prepared as a mixture with the component (C). As a material containing the mixture, for example, a commercially available material can be used. An example of the commercially available material includes "GRANDIC PC-4100" (trade name) produced by Dainippon Ink and Chemicals, Inc. The weight-average molecular weight (Mw) of the material containing the mixture is not particularly limited.

By the use of the component (E), the surface structure of the hard coat layer obtained is strengthened, the slippability is improved, and a more superior abrasion resistance is obtained, for example. From the viewpoint of compatibility between the abrasion resistance and the soil resistance, the blending ratio of the component (E) relative to the component (A) is as follows. That is, preferably, the blending ratio of the component (B) is in the range from 0.05 to 0.4 parts by weight and the blending ratio of the component (C) and the component (E) in total is in the range from 0.1 to 1 parts by weight relative to 100 parts by weight of the component (A). More preferably, the blending ratio of the component (B) is in the range from 0.1 to 0.3 parts by weight and the blending ratio of the component (C) and the component (E) in total is in the range from 0.2 to 1 parts by weight relative to 100 parts by weight of the component (A).

The composition for forming hard coat layer may contain, within the range not impairing its performance, a pigment, a filler, a dispersant, a plasticizer, an ultraviolet absorber, a surfactant, an antioxidant, a thixotropic agent, and the like if needed. One of the additives may be used alone or two or more of them may be used in combination.

By adding fine particles to the composition for forming hard coat layer, a transparent conductive film further provided with antiglare properties can be obtained. Main functions of the fine particles are to make asperities on the surface of a hard coat layer to be formed for giving antiglare properties and to control the haze value of the hard coat layer. The haze value of the hard coat layer can be designed by controlling the refractive index difference between the fine particles and the composition for forming hard coat layer. The fine particles include, for example, inorganic fine particles and organic fine particles. Examples of the inorganic fine particles include, but not limited to, a silicon oxide particle, a titanium oxide particle, an aluminum oxide particle, a zinc oxide particle, a tin oxide particle, a calcium carbonate particle, a barium sulfate particle, a talc particle, a kaolin particle, and a calcium sulfate particle. Examples of the organic fine particles include, but not limited to, a polymethyl methacrylate resin powder (PMMA fine particle), a silicone resin powder, a polystyrene resin powder, a polycarbonate resin powder, an acrylic styrene resin powder, a benzoguanamine resin powder, a melamine resin powder, a polyolefin resin powder, a polyester resin powder, a polyamide resin powder, a polyimide resin powder, and a polyfluoroethylene resin powder. One of the inorganic fine particles and organic fine particles may be used alone or two or more of them may be used in combination.

With respect to the composition for forming hard coat layer, in the case where the component (A) contains a photocurable compound, for example, conventionally known photoinitiators as described in JP2008-88309A can be used. One of the photoinitiators may be used alone or two or more of them may be used in combination. The blending amount of the photoinitiator is not particularly limited. The blending amount of the photoinitiator is, for example, in the range from 1 to 30 parts by weight relative to 100 parts by weight of the component (A) and preferably in the range from 1 to 25 parts by weight relative to 100 parts by weight of the component (A).

As the method of forming a coating film by applying the composition for forming hard coat layer to the transparent film base or the transparent conductive layer that is formed on the transparent film base, for example, coating methods such as fountain coating, dye coating, spin coating, spray coating, gravure coating, roller coating, and bar coating can be employed. After the coating film is formed, the coating film is cured. In advance of the cure, preferably, the coating film is dried. The coating film may be dried, for example, naturally, by air, by heating, or by a method of the combination thereof.

The method of curing the coating film of the composition for forming hard coat layer is not particularly limited. As the method of curing, ionizing radiation curing is preferred. Various types of active energy can be used for the method of curing. As the active energy, ultraviolet is preferred. Preferable examples of an energy radiation source include radiation sources such as a high-pressure mercury lamp, a halogen lamp, a xenon lamp, a metal halide lamp, a nitrogen laser, an electron beam accelerator, and a radioactive element. The irradiation amount from the energy radiation source is preferably in the range from 50 to 5000 mJ/cm$^2$ as an integrated exposure amount at an ultraviolet wavelength of 365 nm. When the irradiation amount is 50 mJ/cm$^2$ or more, sufficient cure can be achieved and sufficient hardness of the hard coat layer formed can be achieved. When the irradiation amount is 5000 mJ/cm$^2$ or less, the hard coat layer formed can be prevented from being colored and the transparency thereof can be improved.

In the manner described above, the transparent conductive film of the present invention can be produced. It is to be noted that the transparent conductive film of the present invention may be produced by a method other than the aforementioned method.

Figure 1:
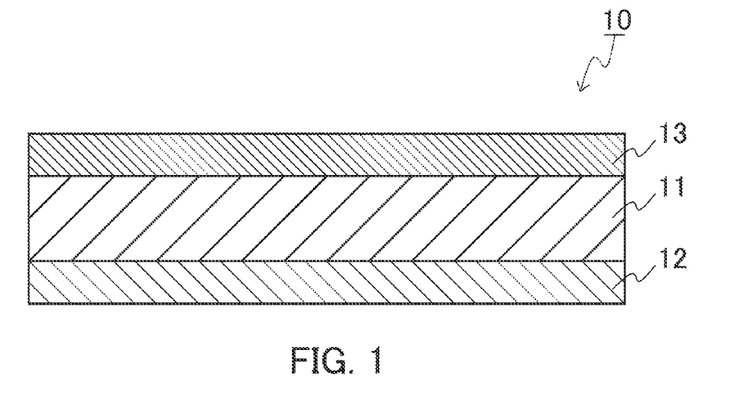
FIG. 1 is a schematic cross sectional view showing an example of the transparent conductive film of the present invention.

An example of the configuration of the transparent conductive film of the present invention is shown in the schematic cross sectional view of FIG. 1. In FIG. 1, in order to make it clearly understandable, for example, the sizes and ratios of respective components differ from actual ones. As shown in FIG. 1, in this transparent conductive film 10, a transparent conductive layer 12 is formed on one side of a transparent film base 11 and a hard coat layer 13 is formed on the other side of the transparent film base 11. However, the present invention is not limited thereto. In accordance with the intended use of the transparent conductive film, it can take a configuration in which a transparent conductive layer 12 is formed on one side of a transparent film base 11 and a hard coat layer 13 is formed on the transparent conductive layer 12 as a transparent conductive film 20 shown in the schematic cross sectional view of FIG. 2. Further, the hard coat layer 13 in each of these examples is a monolayer. However, the present invention is not limited thereto, and the hard coat layer 13 may have a multilayer structure in which at least two layers are laminated. In this case, at least, the hard coat layer formed from the composition for forming hard coat layer of the present invention may be placed at the outermost surface.

The foregoing transparent conductive films are used favorably, for example, for a resistive film type touch panel, a capacitive type touch panel, and the like.

Figure 2:
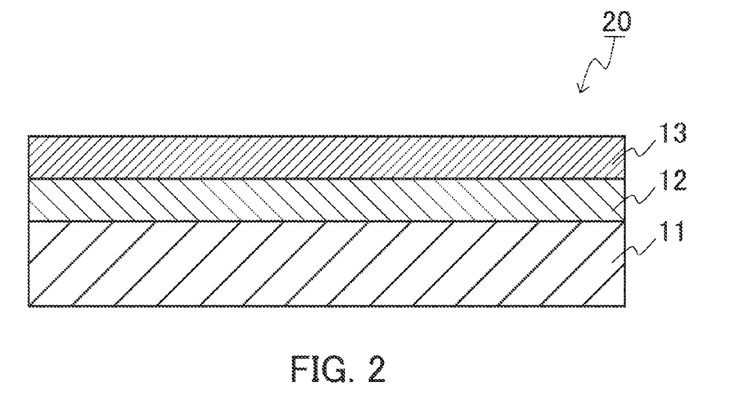
FIG. 2 is a schematic cross sectional view showing another example of the transparent conductive film of the present invention.

The hard coat layer 13 may be the one further applied with antireflection treatment, antiglare treatment, or the like.

Figure 3:
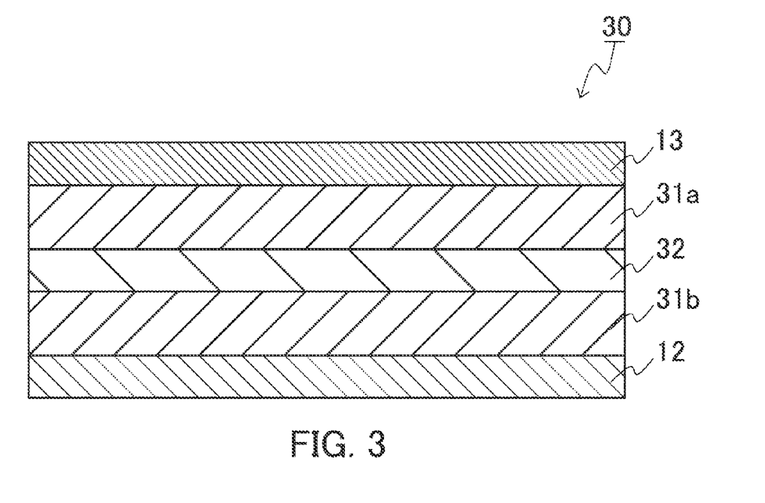
FIG. 3 is a schematic cross sectional view showing yet another example of the transparent conductive film of the present invention.
Figure 5:
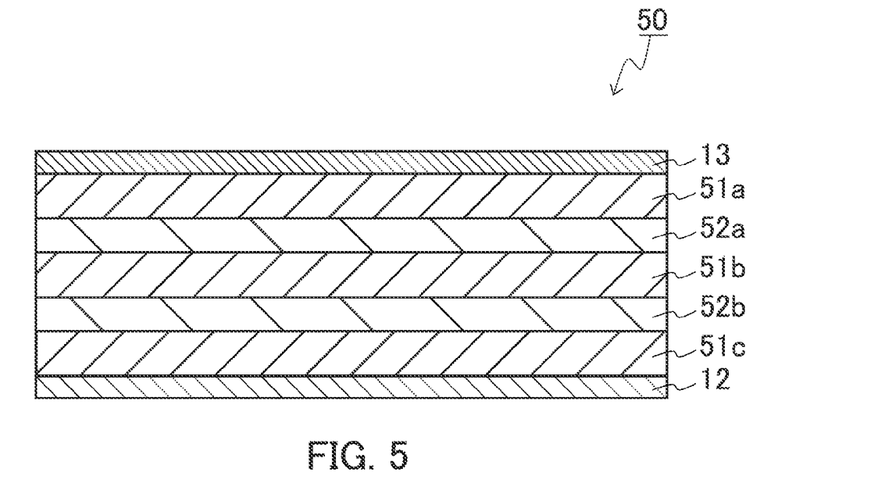
FIG. 5 is a schematic cross sectional view showing still another example of the transparent conductive film of the present invention.

Yet another example of the configuration of the transparent conductive film of the present invention is shown in the schematic cross sectional view of FIG. 3. In FIG. 3, identical parts to those shown in FIG. 1 are indicated with identical numerals and symbols. A transparent conductive film 30 shown in FIG. 3 is an example of the case in which a laminate obtained by bonding two transparent films 31a and 31b via a transparent adhesive agent layer 32 is used instead of the transparent film base 11 of FIG. 1. As in this example, in the case where the transparent film base is a laminate of plural transparent films, the transparent conductive film is used for a touch panel, an electrode of an electronic device, or the like in a state where the plural transparent films are laminated. The transparent conductive film of this example can be produced, for example, by bonding a first transparent film on which a hard coat layer is formed and a second transparent film on which a transparent conductive layer is formed. Further, the size (area) of each transparent film can be different. Although two transparent films are laminated in FIG. 3, more than two transparent films can be laminated. For example, as shown in the schematic cross sectional view of FIG. 5, three transparent films may be laminated. In FIG. 5, identical parts to those shown in FIG. 1 are indicated with identical numerals and symbols. A transparent conductive film 50 shown in FIG. 5 is an example of the case in which a laminate obtained by bonding three transparent films 51a, 51b, and 51c via transparent adhesive agent layers 52a and 52b is used instead of the transparent film base 11 of FIG. 1. As in this example, in the case where the transparent film base is a laminate of three transparent films, the thickness of a first transparent film (for example, the transparent film 51c in FIG. 5) on which a transparent conductive layer is formed is preferably in the range from 20 to 200 μm and more preferably in the range from 20 to 125 μm. The thickness of a second transparent film (for example, the transparent film 51b in FIG. 5) on which the transparent conductive layer and a hard coat layer having the soil resistance are not formed is preferably in the range from 20 to 300 μm. The thickness of a third transparent film (for example, the transparent film 51a in FIG. 5) on which the hard coat layer is formed is preferably in the range from 20 to 300 μm.

<Touch Panel>

Figure 4:
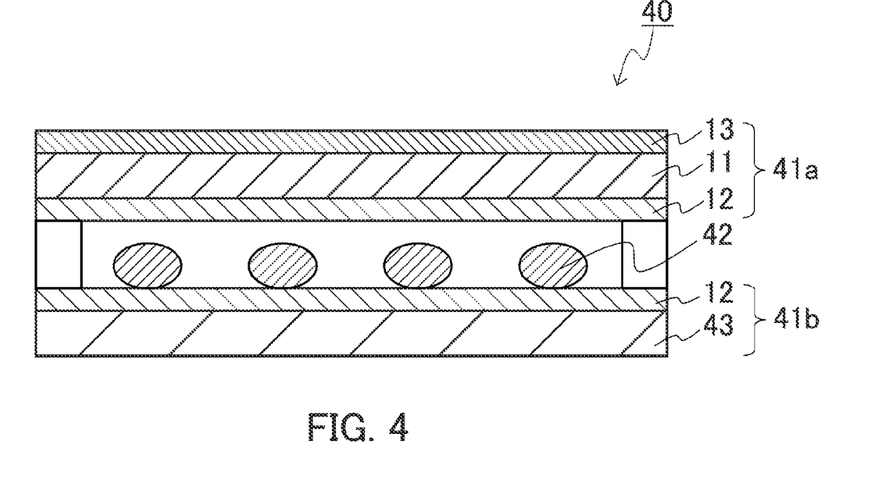
FIG. 4 is a schematic cross sectional view showing an example of the configuration of the touch panel of the present invention.

An example of the configuration of the touch panel of the present invention is shown in the cross sectional view of FIG. 4. In FIG. 4, identical parts to those shown in FIG. 1 are indicated with identical numerals and symbols. As shown in FIG. 4, this touch panel 40 is provided with a spacer 42 and a pair of panel plates 41a and 41b each including a transparent conductive layer. A first panel plate 41a corresponds to the transparent conductive film 10 of the present invention shown in FIG. 1. A second panel plate 41b has the configuration in which the transparent conductive layer 12 is laminated on the substrate 43. The pair of panel plates 41a and 41b are arranged via the spacer 42 such that the respective transparent conductive layers face to each other. The substrate 43 may be, for example, the transparent film base described above. Further, in the case where a touch panel does not require flexibility, for example, the substrate 43 may be a glass plate, a film plastic, or a plate plastic having a thickness of about 0.05 to 10 mm. The materials of the plastic are the same as those described for the material of the transparent film base.

Figure 6:
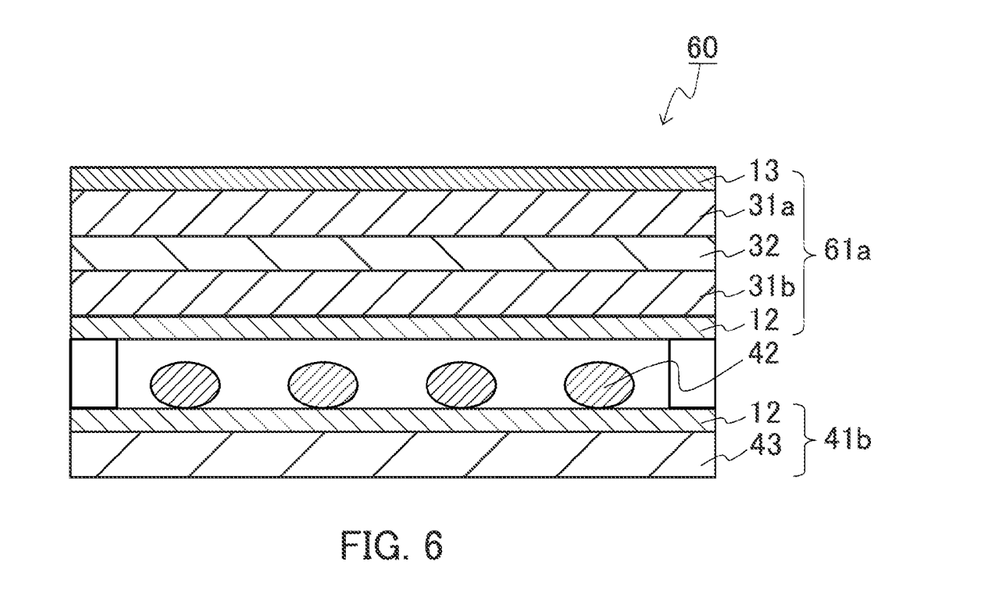
FIG. 6 is a schematic cross sectional view showing another example of the configuration of the touch panel of the present invention.
Figure 7:
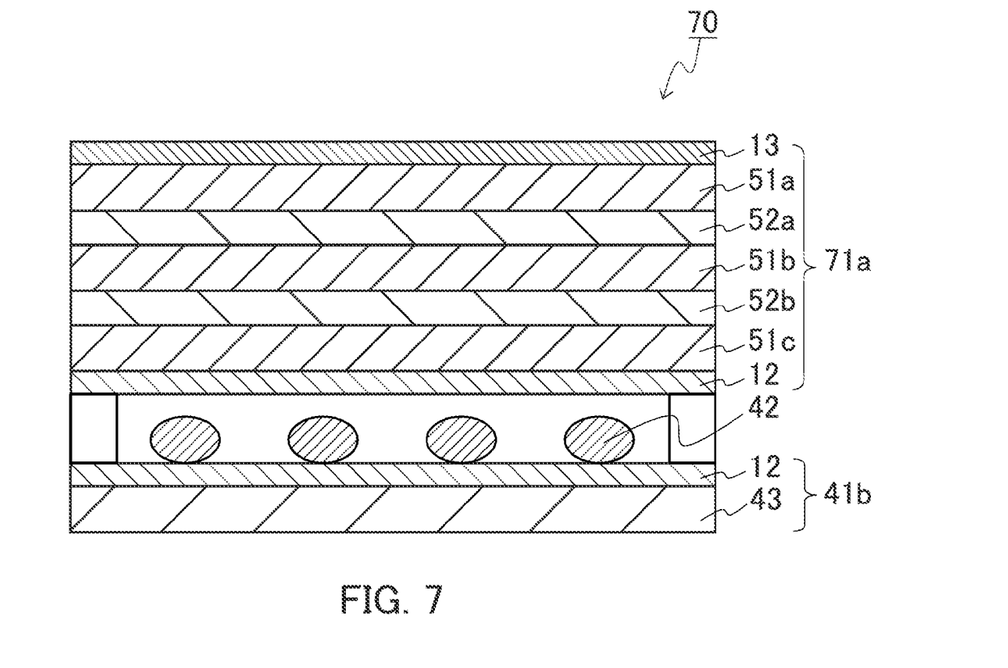
FIG. 7 is a schematic cross sectional view showing yet another example of the configuration of the touch panel of the present invention.

The touch panel 40 is a resistive film type touch panel having the mechanism as follows. That is, when the touch panel 40 is press-tapped from the first panel plate 41a side by a finger, an input pen, or the like against the elastic force of the spacer 42, the respective transparent conductive layers of the pair of panel plates 41a and 41b are brought into contact with each other, and an electric circuit is turned into the ON state. On the other hand, when the press is released, it returns to the OFF state. In other words, this touch panel 40 can function as a transparent switch structure. Since the first panel plate 41a corresponds to the transparent conductive film of the present invention shown in FIG. 1, for example, it is superior in an abrasion resistance, a soil resistance, and tap properties and the functions can be maintained stably for a long period of time. However, the touch panel of the present invention is not limited thereto. For example, with respect to the touch panel of the present invention, a first panel plate may be a panel plate 61a made of the transparent conductive film of the present invention shown in FIG. 3 as a touch panel 60 shown in FIG. 6 or a first panel plate may be a panel plate 71a made of the transparent conductive film of the present invention shown in FIG. 5 as a touch panel 70 shown in FIG. 7. Further, a second panel plate 41b may be the transparent conductive film of the present invention.

A conventionally known spacer can be used as the spacer 42. The production method, size, location position, and quantity of the spacer 42 are not particularly limited. Further, the spacer 42 can be a conventionally known shape such as a substantial sphere, a polygon, or the like.

The transparent conductive film of the present invention can be used favorably for a capacitive type touch panel. The capacitive type touch panel is a touch panel that makes a uniform electric field on the surface of the panel and senses the change of capacitance due to contact by a finger. For the capacitive type touch panel, in addition to the transparent conductive film of the present invention shown in FIG. 1, the transparent conductive film of the present invention shown in FIG. 2 in which the hard coat layer 13 is formed on the transparent conductive layer 12 can also be used preferably.

As described above, the transparent conductive film of the present invention can be applied favorably, for example, to a resistive film type touch panel, a capacitive type touch panel, and an ultrasonic type touch panel. In particular, the transparent conductive film of the present invention is favorable for a capacitive type touch panel. In the case where the transparent conductive film of the present invention is used for a touch panel, in view of providing a superior soil resistance, the transparent conductive film of the present invention is preferably used in the configuration in which a hard coat layer is laminated at the outermost surface side (for example, at the side to be viewed of the touch panel), which is to be contacted by a finger, a pen, or the like. Further, the transparent conductive film of the present invention can favorably be applied for electronic devices such as flexible display devices of an electrophoretic type, a twist ball type, a thermal rewritable type, an optical recording liquid crystal type, a polymer-dispersed liquid crystal type, a guest-host liquid crystal type, a toner display type, a chromism type, and an electro deposition type. In addition to touch panels and display devices, the transparent conductive film of the present invention can be used for an arbitrary purpose that requires conductivity. For example, the transparent conductive film of the present invention can be used for an antistatic film, an electromagnetic wave shield, and the like.

Example

Next, Examples of the present invention are described together with Comparative Examples. The present invention is neither limited nor restricted by the following Examples or Comparative Examples. Various properties in the respective Examples and Comparative Examples were evaluated or measured by the following methods.

<Thickness of Hard Coat Layer>

The thickness of the whole hard coat film was measured with a microgauge type thickness gauge produced by Mitutoyo Corporation. Then, the thickness of the transparent film base is subtracted from the thickness of the whole hard coat film to obtain the thickness of the hard coat layer.

<Abrasion Resistance>

The abrasion resistance of the hard coat layer was evaluated by the following tests.

(1) A sample of 150 mm×50 mm was cut from the center part of a hard coat film, and the sample was placed on a glass plate in such a manner that the surface on which a hard coat layer is not formed faced down.

(2) Steel wool #0000 was uniformly placed on a smooth cross section of a cylindrical column having a diameter of 11 mm, and the steel wool #0000 was reciprocated on the sample surface for 10 times with a load of 1.5 kg at about 100 mm/sec. Thereafter, the number of scratches on the sample surface was visually counted and an assessment was made according to the following index.

A: Number of scratches is not more than 10
B: Number of scratches is at least 11 and not more than 29
C: Number of scratches is at least 30

<Pen Slidability>

The abrasion resistance of the hard coat layer was evaluated by the following pen sliding test.

A pen (tip diameter: 0.8R) made from polyacetal was used. Sliding of the pen for a million times was performed by reciprocating the tip of the pen on the hard coat layer at the side of a panel plate configured of a transparent conductive laminate with a load of 500 g and a stroke of 100 mm at 5000 mm/min. Thereafter, the surface of the hard coat layer was observed.

A: No scratch was found on area of hard coat layer where pen was slid
B: Scratches were found only on areas of hard coat layer where pen was turned back
C: Scratches were found over entire area of hard coat layer where pen was slid <Pencil Hardness>

A sample of 100 mm×50 mm was cut from the center part of a hard coat film, and the sample was placed on a glass plate in such a manner that the surface on which a hard coat layer is not formed faced down. Thereafter, the pencil hardness was measured at a load of 500 g according to the pencil hardness test described in JIS K 5600-5-4. As for the pencil, "Uni" (tested by Japan Paint Inspection and Testing Association, for pencil scratch test) produced by MITSUBISHI PENCIL CO., LTD. was used.

<Surface Free Energy>

Using a "fully automated contact angle meter DM700" produced by Kyowa Interface Science Co., Ltd., contact angles of water and hexadecane were measured, and the surface free energy was calculated with analysis software FAMAS. As for the calculation method, analysis of two components according to Kaelble-Uy theory was employed.

<Measurement of Intensity of Atom by ESCA>

A sample piece obtained by cutting the sample with about 5 mm per side was placed on a molybdenum (Mo) plate and the sample piece was fixed to a sample platform with the Mo plate. Using "QUANTUM 2000" produced by ULVAC-PHI, INCORPORATED, the intensity of an atom was measured. The X-ray source used was monochrome AlKα, the X-ray output was 30 W (15 kV), the measurement region was 200 μmφ, and the takeoff angle of photoelectron was 45° relative to the sample surface. The binding energy correction was performed by correcting the peak resulted from C—C binding of C1s spectrum to 285.0 eV. Neutralization was performed by using a neutralizing gun in combination with an Ar ion gun (neutralization mode).

Arbitrary two spots of the sample were measured by wide scanning at 0 to 1100 eV and a qualitative analysis was performed. The element detected was subjected to narrow scanning and the element ratio (atomic %) was calculated. With respect to Si2p spectrum, a waveform analysis was performed at peaks belonging to the respective bindings of bifunctional silicon, polyfunctional silicon and SiOx, and the intensity of a silicon atom derived from a reactive silicon-containing compound was calculated.

With the conditions described above, the ratio of the intensity of each atom with respect to an area from the outermost surface of the sample to a depth of about 5 to 10 nm can be measured. For removing contaminants, the surface of the sample was preliminarily cleaned by wiping to the degree not breaking the surface of the sample. Further, contaminants were removed by etching with C60 ion gun.

<Weight-Average Particle Size of Particle (Component (B))>

A resin row material containing the component (B) was diluted by methyl ethyl ketone (MEK) to have a solid content concentration of 10%. Then, the particle size distribution was measured by dynamic light scattering particle size distribution analyzer ("LB-500" produced by HORIBA, Ltd.). From the obtained particle size distribution, the weight-average particle size was calculated.

<Weight-Average Molecular Weight>

The weight-average molecular weight was measured by a gel-permeation chromatography (GPC) method with polystyrene as a standard sample. Specifically, the weight-average molecular weight was measured with the following devices and tools according to the following conditions.

Analyzer: "SC-8020" (trade name) produced by Tosoh Corp.
Column: "SHODEX" (trade name) produced by Showa Denko K.K.
Column size: 20.0 mmϕ×500 mm
Column temperature: room temperature
Eluent chloroform
Flow rate: 3.5 mL/min
Inlet pressure: 70 kgf/cm$^2$ (6.9 MPa)

Example 1

<Preparation of Composition for Forming Hard Coat Layer>

A resin raw material containing the component (A) ("OPSTAR Z7540" (trade name) produced by JSR Corporation; solid content: 56 wt %, solvent: butyl acetate/methyl ethyl ketone (MEK)=76/24 (weight ratio)) in which nano-silica particles having surfaces modified with organic compounds containing polymerizable unsaturated groups (the component (D)) were dispersed was provided.

The resin raw material contains dipentaerythritol and isophorone diisocyanate-based polyurethane as the component (A) (ultraviolet-curable compound) and contains silica fine particles having surfaces modified with organic molecules (weight-average particle size: 100 nm or less) as the component (D) at the weight ratio of 2:3 (component (A) in total:component (D)). The refractive index of the cured film of the resin raw material was 1.485.

Relative to 100 parts by weight (the solid content) of this resin raw material, 0.2 parts by weight of reactive fluorine-containing compound ("OPTOOL® DAC" (trade name) produced by DAIKIN INDUSTRIES, Ltd.; solid content: 20%, solvent: 1H,1H,3H-tetrafluoropropanol), 0.5 parts by weight of reactive silicon-containing compound ("GRANDIC PC-4100" (trade name) produced by Dainippon Ink and Chemicals, Inc.), and 0.5 parts by weight of photoinitiator ("IRGACURE 127" (trade name) produced by Ciba Specialty Chemicals Inc.) were added. Then the resultant was diluted using butyl acetate so that the solid content concentration becomes 50 wt %, and thereby prepared a composition for forming hard coat layer. Here, the reactive fluorine-containing compound is represented by the general formula (1). In R in the general formula (1), a main component is a compound that includes one substituent including a fluoroalkyl group having the structure represented by the general formula (2) and two substituents each including an acrylate group having the structure represented by the general formula (3). Further, the reactive silicon-containing compound is a mixture containing the following component 1, component 2, and solvent.

Component 1: reactive silicone represented by general formula (4) (the ratio (molar ratio) among polydimethylsiloxane unit (c) of general formula (5) (X1), methyl hydroxypropyl siloxane unit (b) of general formula (5) (X2), (6-isocyanatehexyl)isocyanuric acid unit of the general formula (9) (X3), and substituent (d) of general formula (7) (X4) is 187:39:100:57 (X1:X2:X3:X4) (6.85 parts by weight)
Component 2: glycol-based compound represented by general formula (8) (3.15 parts by weight)
Solvent: ethyl acetate (90 parts by weight)

<Formation of Hard Coat Layer>

The composition for forming hard coat layer was applied to one side of a transparent film base (PET film having a thickness of 125 μm) provided with easy adhesion layers on its both sides with a bar coater to form a coating film. After the composition for forming hard coat layer had applied to the transparent film base, the coating film was dried by heating at 60° C. for 1 minute. Cure treatment was applied to the dried coating film by irradiating ultraviolet with an integrated exposure amount of 300 mJ/cm$^2$ using a metal halide lamp, and thereby formed a hard coat layer having a thickness of 7 μm.

<Formation of Transparent Conductive Layer>

On the side of the PET film where the hard coat layer was not formed, under 4×10$^3$ Torr (5.33×10$^5$ Pa) atmosphere of argon gas (80%) and oxygen gas (20%), a transparent conductive layer made of an ITO film (refractive index of light: 2.00) having a thickness of 25 nm was formed by a reactive sputtering method using a sintered compact of indium oxide (90 wt %) and tin oxide (10 wt %). In this manner, the transparent conductive film of this Example was produced.

Example 2

The transparent conductive film of this Example was obtained in the same manner as in Example 1 except that the hard coat layer having a thickness of 15 μm was formed.

Example 3

The transparent conductive film of this Example was obtained in the same manner as in Example 1 except that the amount of the reactive fluorine-containing compound was 0.1 parts by weight and the amount of the reactive silicon-containing compound was 0.5 parts by weight.

Example 4

The transparent conductive film of this Example was obtained in the same manner as in Example 1 except that the amount of the reactive fluorine-containing compound was 0.2 parts by weight and the amount of the reactive silicon-containing compound was 0.2 parts by weight.

Example 5

The transparent conductive film of this Example was obtained in the same manner as in Example 1 except that the amount of the reactive fluorine-containing compound was 0.1 parts by weight and the amount of the reactive silicon-containing compound was 1 part by weight.

Example 6

The transparent conductive film of this Example was obtained in the same manner as in Example 1 except that the amount of the reactive fluorine-containing compound was 0.2 parts by weight and the amount of the reactive silicon-containing compound was 1 part by weight.

Example 7

The transparent conductive film of this Example was obtained in the same manner as in Example 1 except that the amount of the reactive fluorine-containing compound was 0.1 parts by weight and the amount of the reactive silicon-containing compound was 0.2 parts by weight.

Example 8

The transparent conductive film of this Example was obtained in the same manner as in Example 1 except that the amount of the reactive fluorine-containing compound was 0.1 parts by weight and the amount of the reactive silicon-containing compound was 0.1 parts by weight.

Example 9

The transparent conductive film of this Example was obtained in the same manner as in Example 1 except that the amount of the reactive fluorine-containing compound was 0.2 parts by weight and the amount of the reactive silicon-containing compound was 0.1 parts by weight.

Example 10

In the same manner as in Example 1, a hard coat layer was formed on one side of a first PET film (thickness of 125 μm) provided with easy adhesion layers on its both surfaces. On one side of a second PET film (thickness of 25 μm), under $4 \times 10^3$ Torr ($5.33 \times 10^5$ Pa) atmosphere of argon gas (80%) and oxygen gas (20%), a transparent conductive layer made of an ITO film (refractive index of light: 2.00) having a thickness of 25 nm was formed by a reactive sputtering method using a sintered compact of indium oxide (90 wt %) and tin oxide (10 wt %). On the side of the first PET film where the hard coat layer was not formed, an acrylic-based transparent adhesive layer having a thickness of about 20 μm was formed. On this adhesive layer side, the side of the second PET film where the transparent conductive layer was not formed was bonded to produce a laminate. In this manner, the transparent conductive film of this Example was produced.

Comparative Example 1

The transparent conductive film of this Comparative Example was obtained in the same manner as in Example 1 except that the reactive fluorine-containing compound and the reactive silicon-containing compound were not added.

Comparative Example 2

The transparent conductive film of this Comparative Example was obtained in the same manner as in Example 1 except that the reactive fluorine-containing compound was not added and the amount of the reactive silicon-containing compound was 0.2 parts by weight.

Comparative Example 3

The transparent conductive film of this Comparative Example was obtained in the same manner as in Example 1 except that the reactive fluorine-containing compound was not added and the amount of the reactive silicon-containing compound was 1 part by weight.

Comparative Example 4

The transparent conductive film of this Comparative Example was obtained in the same manner as in Example 1 except that the amount of the reactive fluorine-containing compound was 0.2 parts by weight and the reactive silicon-containing compound was not added.

Comparative Example 5

The transparent conductive film of this Comparative Example was obtained in the same manner as in Example 1 except that the amount of the reactive fluorine-containing compound was 1 part by weight and the reactive silicon-containing compound was not added.

With respect to the transparent conductive films of Examples and Comparative Examples obtained in this manner, various properties were measured or evaluated. The results thereof are summarized in the following table 1.

TABLE 1

|  | Reactive fluorine-containing compound (parts by weight) | Reactive silicon-containing compound (parts by weight) | Thickness of hard coat layer (μm) | Intensity of atom derived from reactive fluorine-containing compound (%) | Intensity of atom derived from reactive silicon-containing compound (%) | Abrasion resistance | Pen slid-ability | Pencil hardness | Surface free energy (mJ/m$^2$) |
|---|---|---|---|---|---|---|---|---|---|
| Ex. 1 | 0.2 | 0.5 | 7.0 | 25.55 | 0.81 | A | A | 3H | 16.0 |
| Ex. 2 | 0.2 | 0.5 | 15.0 | 21.50 | 0.42 | A | A | 4H | 15.9 |
| Ex. 3 | 0.1 | 0.5 | 7.0 | 17.00 | 3.38 | A | A | 3H | 18.0 |
| Ex. 4 | 0.2 | 0.2 | 7.0 | 27.15 | 0.30 | A | A | 3H | 15.8 |
| Ex. 5 | 0.1 | 1.0 | 7.0 | 19.45 | 3.52 | A | A | 3H | 18.7 |
| Ex. 6 | 0.2 | 1.0 | 7.0 | 25.00 | 2.20 | A | A | 3H | 16.3 |
| Ex. 7 | 0.1 | 0.2 | 7.0 | 20.55 | 1.39 | B | B | 3H | 17.6 |
| Ex. 8 | 0.1 | 0.1 | 7.0 | 18.60 | 1.06 | B | B | 3H | 17.5 |
| Ex. 9 | 0.2 | 0.1 | 7.0 | 22.00 | 0.45 | B | B | 3H | 15.7 |
| Ex. 10 | 0.2 | 0.5 | 7.0 | 25.55 | 0.81 | A | A | 3H | 16.0 |
| Comp. Ex. 1 | 0 | 0 | 7.0 | 0.00 | 0.32 | C | C | 3H | 37.8 |

TABLE 1-continued

| | Reactive fluorine-containing compound (parts by weight) | Reactive silicon-containing compound (parts by weight) | Thickness of hard coat layer (μm) | Intensity of atom derived from reactive fluorine-containing compound (%) | Intensity of atom derived from reactive silicon-containing compound (%) | Abrasion resistance | Pen slid-ability | Pencil hardness | Surface free energy (mJ/m$^2$) |
|---|---|---|---|---|---|---|---|---|---|
| Comp. Ex. 2 | 0 | 0.2 | 7.0 | 0.00 | 0.75 | C | C | 3H | 24.3 |
| Comp. Ex. 3 | 0 | 1.0 | 7.0 | 0.00 | 7.53 | C | C | 3H | 24.1 |
| Comp. Ex. 4 | 0.2 | 0 | 7.0 | 23.00 | 0.14 | C | C | 3H | 15.7 |
| Comp. Ex. 5 | 1 | 0 | 7.0 | 30.25 | 0.14 | C | C | 3H | 15.2 |

As summarized in the table 1, the transparent conductive films of Examples each showed a favorable abrasion resistance and a soil resistance that is expressed by the surface free energy value. In particular, the transparent conductive films of Examples 1 to 6 and 10 each showed an excellent abrasion resistance. Further, the transparent conductive films of Examples each showed high pencil hardness and a favorable curling property. In contrast, the transparent conductive films of Comparative Examples each showed an insufficient abrasion resistance. The transparent conductive films of Comparative Examples 1 to 3 each showed a large surface free energy value. Therefore; it cannot be said that each of the transparent conductive films of Comparative Examples 1 to 3 showed a favorable soil resistance. The transparent conductive films of Comparative Examples 4 and 5 each showed a small surface free energy value but showed an insufficient abrasion resistance.

INDUSTRIAL APPLICABILITY

The transparent conductive film of the present invention has sufficient hardness, a superior abrasion resistance, and a superior soil resistance. Therefore, the transparent conductive film of the present invention can be used suitably for touch panes, electronic devices such as flexible display devices, and the like. The use of the transparent conductive film of the present invention is not particularly limited and can be applied to a broad range of technical fields.

EXPLANATION OF REFERENCE NUMERALS

10, 20, 30, and 50 transparent conductive film
11 transparent film base
12 transparent conductive layer
13 hard coat layer
31$a$, 31$b$, 51$a$, 51$b$, and 51$c$ transparent film
32, 52$a$, and 52$b$ transparent adhesive agent layer
40, 60, and 70 touch panel
41$a$, 41$b$, 61$a$, and 71$a$ panel plate
42 spacer
43 substrate

The invention claimed is:
1. A transparent conductive film comprising:
a transparent film base;
a transparent conductive layer; and
a hard coat layer, wherein
the hard coat layer is formed of a composition for forming hard coat containing the following component (A), component (B), component (C), and component (D):

Component (A): curable compound including at least one of acrylate group and methacrylate group;
Component (B): reactive fluorine-containing compound;
Component (C): reactive silicon-containing compound; and
Component (D): particle having inorganic oxide particle surface modified with organic compound containing polymerizable unsaturated group, and having weight-average particle size of 200 nm or less, wherein the component (B) has a structure represented by the following general formula (1):

(1)

where in the general formula (1), at least one of Rs is a substituent including a fluoroalkyl group having a structure represented by the following general formula (2):

(2)

where in the general formula (2), n is an integer of 1 or more; and at least one of Rs is a substituent including at least one of an acrylate group and a methacrylate group, wherein the component (C) has a structure represented by the following general formula (4):

(4)

wherein R in the general formula (4) the substituent having a siloxane structure has a structure represented by the following general formula (5):

(5)

where in the general formula (5), n is an integer of 1 or more.

2. The transparent conductive film according to claim 1, wherein
in R in the general formula (1), the substituent including an acrylate group includes a substituent represented by the following general formula (3):

(3)

3. The transparent conductive film according to claim 1, wherein the composition for forming hard coat contains the component (B) in a range from 0.05 to 0.4 parts by weight and the component (C) in a range from 0.05 to 1 parts by weight relative to 100 parts by weight of the component (A).

4. The transparent conductive film according to claim 1, wherein the weight-average particle size of the component (D) is in a range from 1 to 100 nm.

5. The transparent conductive film according to claim 1, wherein the component (D) contains at least one fine particle selected from the group consisting of titanium oxide, silicon oxide, aluminum oxide, zinc oxide, tin oxide, and zirconium oxide.

6. The transparent conductive film according to claim 1, wherein the composition for forming hard coat contains the component (D) in a range from 100 to 200 parts by weight relative to 100 parts by weight of the component (A).

7. The transparent conductive film according to claim 1, wherein the composition for forming hard coat further contains the following component (E):
Component (E): glycol-based compound represented by general formula (8)

(8)

where in the general formula (8),
m is an integer of 1 or more and n is an integer of 1 or more.

8. The transparent conductive film according to claim 7, wherein the composition for forming hard coat contains the component (B) in a range from 0.05 to 0.4 parts by weight and the component (C) and the component (E) in total in a range from 0.1 to 1 parts by weight relative to 100 parts by weight of the component (A).

9. The transparent conductive film according to claim 1, wherein an intensity of a fluorine atom derived from the reactive fluorine-containing compound of an outermost layer of the hard coat layer is within a range from 5 to 30% according to an analysis of ESCA, and
an intensity of a silicon atom derived from the reactive silicon-containing compound of the outermost layer of the hard coat layer is within a range from 0.2 to 10% according to the analysis of ESCA.

10. The transparent conductive film according to claim 1, wherein a thickness of the hard coat layer is in a range from 3 to 50 μm.

11. The transparent conductive film according to claim 1, wherein a pencil hardness of a surface of the hard coat layer at a load of 500 g according to JIS K 5600-5-4 is 4H or more.

12. The transparent conductive film according to claim 1, wherein a surface free energy of a surface of the hard coat layer is in a range from 15 to 25 mJ/m².

13. The transparent conductive film according to claim 1, wherein the hard coat layer further contains fine particles.

14. The transparent conductive film according to claim 1, wherein the transparent conductive film includes the hard coat layer on one side of the transparent film base and includes the transparent conductive layer on the other side of the transparent film base.

15. The transparent conductive film according to claim 1, wherein the transparent film base is a laminate obtained by bonding plural transparent films via transparent adhesive agent layers.

16. The transparent conductive film according to claim 15, wherein at least one of the transparent films is a decorative film.

17. An electronic device comprising:
a transparent conductive film, wherein the transparent conductive film is the transparent conductive film according to claim 1.

18. A touch panel comprising:
a transparent conductive film, wherein the transparent conductive film is the transparent conductive film according to claim 1.

* * * * *